(12) United States Patent  
Coronado

(10) Patent No.: US 9,109,362 B2  
(45) Date of Patent: Aug. 18, 2015

(54) LIGHT WEIGHT PANEL AND METHOD OF MANUFACTURE

(71) Applicant: Hector M. Coronado, Los Angeles, CA (US)

(72) Inventor: Hector M. Coronado, Los Angeles, CA (US)

( * ) Notice: Subject to any disclaimer, the term of this patent is extended or adjusted under 35 U.S.C. 154(b) by 210 days.

(21) Appl. No.: 13/887,271

(22) Filed: May 3, 2013

(65) Prior Publication Data

US 2014/0329047 A1 Nov. 6, 2014

Related U.S. Application Data

(60) Provisional application No. 61/641,763, filed on May 2, 2012.

(51) Int. Cl.
*B27D 5/00* (2006.01)
*E04C 2/12* (2006.01)

(52) U.S. Cl.
CPC .............. *E04C 2/12* (2013.01); *Y10T 156/1052* (2015.01); *Y10T 428/24091* (2015.01)

(58) Field of Classification Search
CPC ............ B27D 1/04; B32B 3/14; B32B 21/04; B32B 21/13; B32B 21/14; B27M 3/006
USPC .......................... 428/50, 55, 56, 106; 156/250
See application file for complete search history.

(56) References Cited

U.S. PATENT DOCUMENTS 4,111,247 A * 9/1978 Hasenwinkle ................ 144/351

FOREIGN PATENT DOCUMENTS

GB 981897 * 1/1965

* cited by examiner

*Primary Examiner* — Alexander Thomas
(74) *Attorney, Agent, or Firm* — Kleinberg & Lerner, LLP; Marvin H. Kleinberg; Marshall A. Lerner

(57) ABSTRACT

A light weight panel is made from strips of thin wood which are joined side by side in a roughly 45° angle. Sheets of such joined strips are combined in layers with the strips of each layer orthogonal to the strips of the adjacent layer and are bonded into a panel if any desired length and width. A usable structural panel is then cut from the boded sheets so that the strips are diagonal to the edges of the structural panel.

2 Claims, 5 Drawing Sheets

LIGHT WEIGHT PANEL AND METHOD OF MANUFACTURE

BACKGROUND

1. Field of the Invention

The present invention relates to a process for the creation of panels for use in cabinetry, closet industries, prefabricated structures and recreational vehicles, whether marine, terrestrial or extraterrestrial and the resultant panels.

2. Description of the Related Art

Virtually everything in the furniture and even the construction industry, from desks, cabinetry for kitchens or bathrooms, office furniture, to panel systems for offices, prefabricated structures, cabinetry for the recreational vehicle industry including aircraft, marine and terrestrial vehicles, is manufactured with the concept of assembled panels of wood, plastic or other sheet materials.

The current industry standard for lightweight panels, is size limited, rarely exceeding dimensions of 4'×8'. Other multi-ply panels, if solid core, are generally heavy, and contain formaldehyde glues or other potentially toxic materials. Generally they are not completely biodegradable or recyclable.

In the prior art, many panels are composite structures with a substrate or core of an inexpensive material such as particle board and with exterior surface layers of a wood veneer, plastic or foil. In some cases the outer surfaces are metals. In an effort to reduce the weight of these panels, some manufacturers adopted honeycomb structures or hollow core technologies for the base or core layer.

These techniques resulted in panels of reduced weight. Most panels are made with the facing layers having the grain running in the "long" direction with the core layer having grain in the orthogonal direction.

There has developed a substantial industry in the manufacture of thin lightweight panels which are generally 3 ply with a core of $\frac{1}{16}$" and face panels of $\frac{1}{32}$" thickness that, when combined, result in a $\frac{1}{8}$" panel. Other thicknesses and other combinations are available alternatives. As with other conventional panels, the grain of the face panels is in the "long" direction and the central panel has the grain in the orthogonal or "wide" direction. These panels are widely used in prefabricated structures, mobile homes, recreational vehicles and may even be used in aircraft or marine applications. Layers of $\frac{1}{32}$" and $\frac{1}{16}$" thickness are readily available, but rarely in sheets that are greater than 4'×8'.

However, using the industry standard 4'×8' panels, to face an interior wall, widths of up to 40' may be required. This requires that several panels be placed side by side. For a pleasing interior experience, the panels must appear to be seamless. However, the movement of the structure on the highway, during construction or, in the case of aircraft or marine applications, turbulence or wave action, usually results in gaps and cracks where the panels are joined.

What is needed is a process to produce a relatively lightweight panel in lengths greater than 8' from plentiful materials. Such process should provide panels that can be made of renewable and recyclable materials and which can be fabricated with more or less conventional forming equipment. It would also be desirable if such resultant panels could be made without toxic adhesives or other toxic volatile components and in unlimited lengths.

Known techniques can bond adjacent panels, but panels cannot be bonded "end to end" and retain strength or integrity so that the length of the panel is limited by the availability of veneers in which the sheet with the grain in the long direction is, for the most part, in the 8' to 10' range.

SUMMARY OF THE INVENTION

In a preferred embodiment of the present invention, the component panels for a relatively thin composite is created by first creating individual layers from the side to side bonding of individual slats or slats. In a preferred embodiment, 1'×8' slats are bonded together to form sheets whose width is greater than the desired finished panel width and whose length is greater than the finished panel length.

The goal is to produce a multilayer panel having the grain of the face sheets at a 45° angle from the vertical and whose core sheet has the grain at an orthogonal 45° angle, resulting in a multilayer panel with grain of the face sheets orthogonal with the grain of the core sheets.

To achieve this, one could start with slats of virtually any width and a maximum length of 8'. The slats are edge bonded to form sheets that are wider than the intended width of the finished product and whose length is greater than the intended length of the finished product. The face sheets are then bonded to the core sheets using the teachings of my prior copending provisional application Ser. No. 61/551,360 filed 25 Oct. 2011.

For example, to end with a panel whose width is 4' and whose length is 8' would require assembling a blank made up of the staggered side to side bonding of approximately 9 slats, each 1'×8' and cutting out a rectangular panel of the desired dimensions but with the slats being at a 45° angle to the sides of the rectangle. The rectangular panel would have great strength in both length and width.

In creating the 3 ply combination, it has been found that polyethylene films as thin as 1 mil, when placed between layers under pressure and heated to the melting point, when cooled acts as an excellent and inexpensive adhesive with great flexibility. In addition to polyethylene films, other thin film plastics which can melt at or below 500° F. are adequate to bond the surface sheets to the substrate without the use of compounds that have volatile vapors or other contaminants.

In other embodiments, a $\frac{1}{16}$" thick core layer with grain at an angle to the long direction is faced with $\frac{1}{32}$" thick sheets with the grain running in an intersecting pattern. Thin polyethylene film sheets (1 to 2 mil) are placed between the layers and the combination is placed in a press and heated until the film melts, bonding the sheets together into a panel. A plurality of these panels are placed side by side and end to end, either in a a staggered tiled relationship or just in aligned rows and columns. The several panels are bonded together, side to side and end to end using conventional methods. From these resultant sheets, structural panels are cut, parallel to a diagonal of a regular rectangular shape or at an angle to the edges of the constituent panels.

In other alternative embodiments, the individual 3 ply blank panels can be fabricated with the grain of the face panels at some angle other than 45° such as 30° or 60° with the grain of the center panels running in an opposite direction thereto. These other, acute angles may exhibit the same strength as the 45° panels, accordingly, they are still viable alternatives and the invention should not be limited to grain angles of 45°.

The side to side and end to end bonding of panels to form a blank from which the final panel is derived does not result in fault lines or inherent weaknesses in the finished product. This process can produce extended panels for use as wall facing. Moreover, the use of sustainable wood products serves the environment and obviates the need for threatened forest products, the overuse of which has resulted in severe deforestation in Asia.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE PREFERRED EMBODIMENTS

Figure 1:
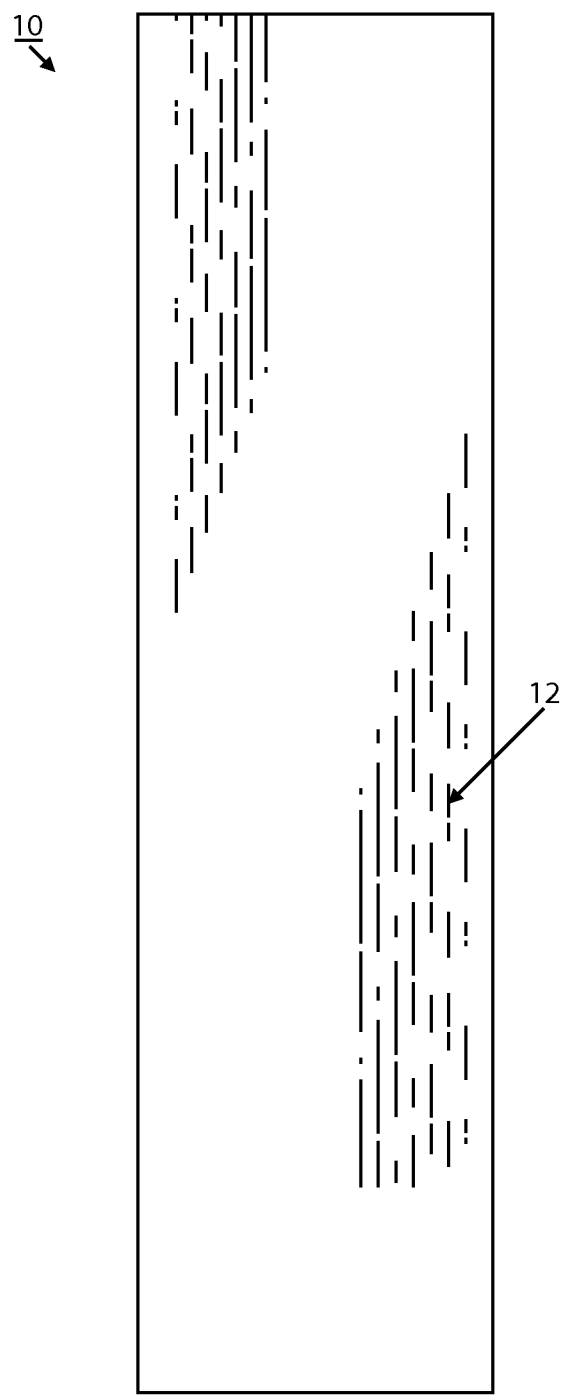
FIG. 1 is a top view of a typical veneer slat to be used in the present invention.

Turning first to FIG. 1, there is shown a veneer slat 10 which is readily available in varying thicknesses and from many sources. For the present invention, hardwoods, such as poplar, sycamore and the like, are preferred choices. The grain 12 of the wood should run in the "long" direction for maximum strength. It has been found that for the face of a laminate, slats of 1/32" are preferable while a 1/16" thickness is used for the core to produce a 1/8" laminate that is suitable for most uses as a wall surface. However, depending upon the ultimate end use, thicker or thinner component layers may be desirable. In addition, other combinations can be utilized, for example, the face slats could be 1/16" and the core 1/32".

Figure 2:
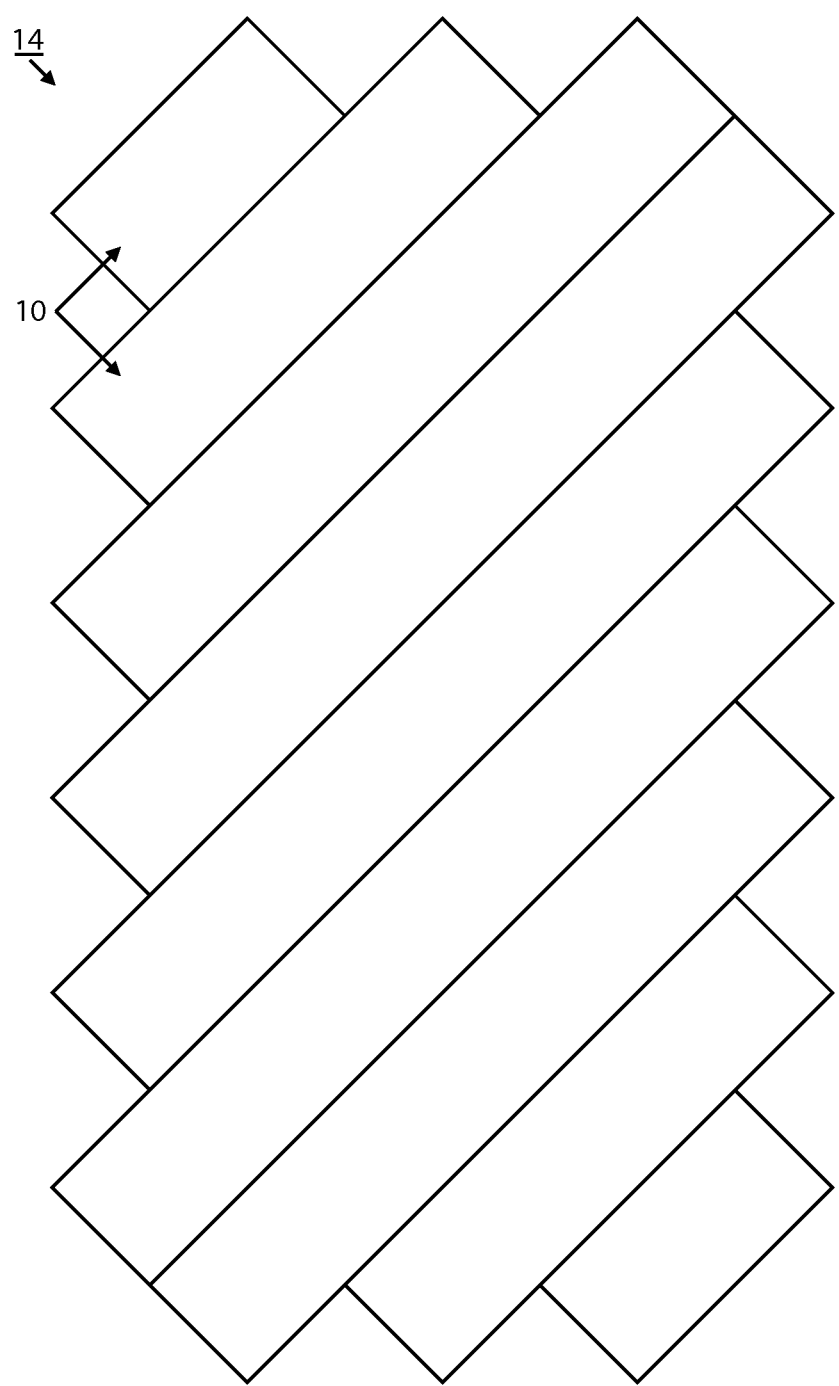
FIG. 2 is a top view of an assembled blank made with the slats of FIG. 1.

In FIG. 2, there is shown a plurality of slats 10 bonded together both side to side and end to end using readily available equipment to create larger sheets 14. As seen in FIG. 2, the slats 10 are aligned in a staggered fashion. To create a panel, both thin slats 10 and thick slats 10' are utilized. A panel layer 16 is cut from the sheet 14, with the grain pattern now at a 45° angle from the "long" direction of the panel layer 16.

With a pair of "face" panel layers 16 comprised of 1/32" slats and a "core" panel layer 16' comprised of 1/16" slats, a 3-ply composite structure can be created. Preferably, the grain direction of the face panel layers 16 is orthogonal to the grain direction of the core panel layer 16'. This can be achieved by merely inverting the core panel layer 16'.

Figure 3:
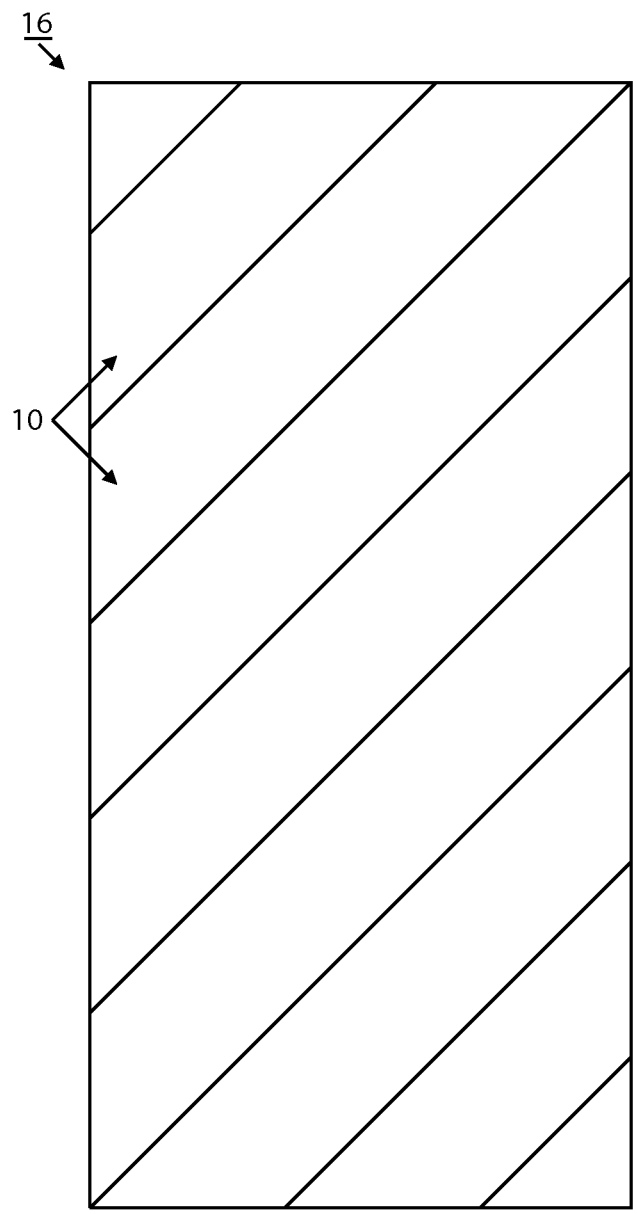
FIG. 3. Is an exploded view of the sheets used to make a 3 ply composite.
Figure 4:
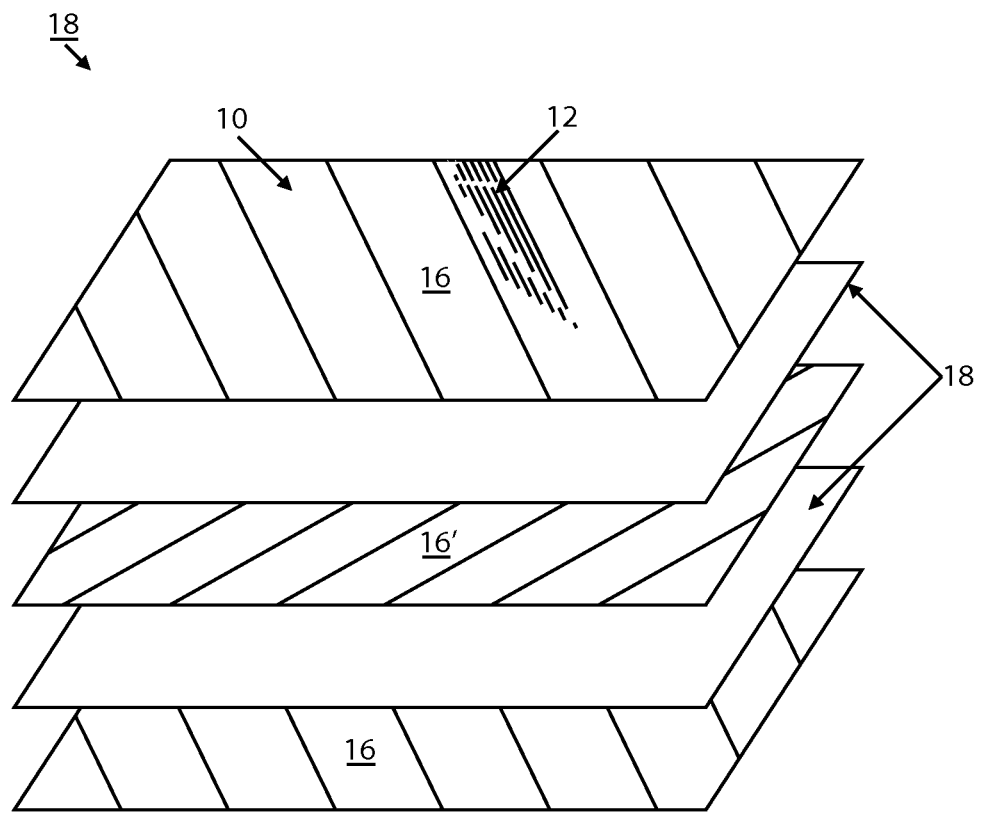
FIG. 4. Is a top view of the assembled blank of FIG. 2 showing the outline of the finished panel.

In FIG. 3. there is shown, in exploded view, the layers which, when bonded together, will form the 3-ply composite panel that is the preferred result of the present invention. In order, there is a first face sheet 14, comprised of slats 10 with the grain 12 running at an angle to the slat edge.

A thin film 18 of polyethylene or some other thin film plastic with a melting point that is less than 500° F. is placed between the face sheet 14 and the core sheet 14' which is made up of slats 10 with the grain 12 orthogonal to the grain of the face sheet 14.

While polyethylene is preferred because of its ready availability and low cost, other comparable plastic thin films can be used, as taught in the copending application. Next to the core sheet 14', another thin film layer 18 is placed and finally a bottom face sheet 14. The sheets are arranged so that the grain direction in the face sheets 14 is orthogonal to the grain direction in the core sheet 14'.

The component elements are assembled and placed into a press that can apply both pressure and heat sufficient to melt the plastic film, which flows into the surfaces of the sheets 14, 14'. The resultant composite panel 18 is now suitable for use in construction.

While the composite panel 18 may be used as it is, it may be desirable to decorate the outer face with either paint or a coating of paper, vinyl, or other surface treatment for the cosmetic effect.

Figure 5:
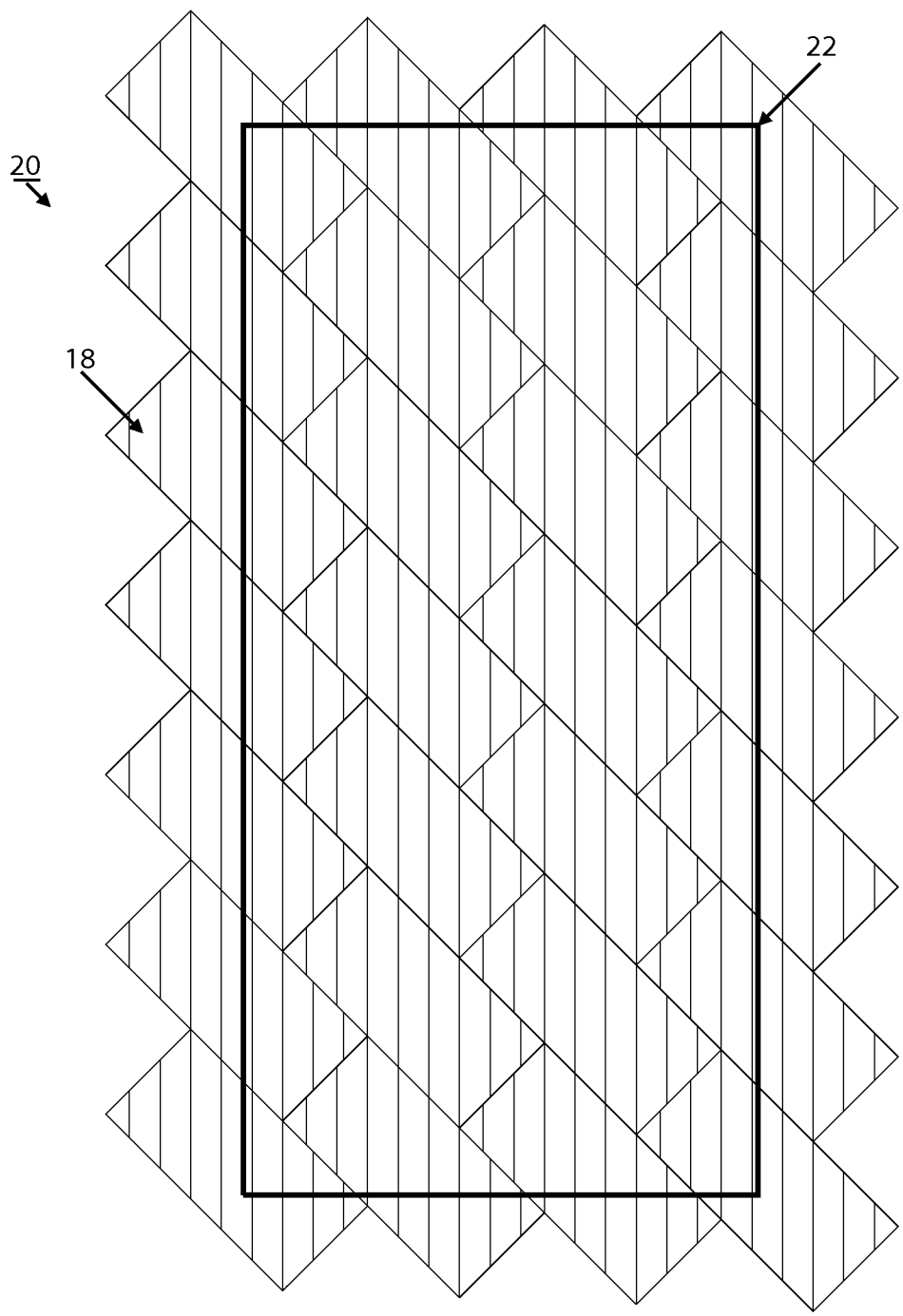
FIG. 5 is a plan view of a finished panel according to the present invention.

Turning next to FIG. 5, a plurality of these panels 18 are placed side by side and end to end, either in a staggered tiled relationship or just in aligned rows and columns. The several panels 18 are bonded together, side to side and end to end using conventional methods to create a sheet 20. From these resultant sheets 20, structural panels 22 are cut, parallel to a diagonal of a regular rectangular shape or at an angle to the edges of the constituent panels.

While panels with the grain of the core being orthogonal to the grain of the face panels are optimum, lesser angles may be employed. Further, panels with the grain running at a 45° angle to a side edge provide optimum strength to the composite. However, other angles, ranging from approximately 30° to approximately 60° are acceptable, but less preferable.

What is claimed as new is:

1. A method of making a structural sheet comprising the steps of:
   a. creating a first slat by joining rectangular wooden strips end to end and side to side;
   b. creating a second slat by joining rectangular wooden strips end to end and side to side;
   c. orienting said first slat so that the strips of said first slat are aligned diagonally;
   d. orienting said second slat so that the strips of said second slat are aligned diagonally;
   e. placing a first adhesive material on a surface of said first slat;
   f. placing said second slat on said first adhesive material with the strips of said second slat aligned orthogonally to the strips of said first slat;
   g. creating a third slat by joining rectangular wooden strips side to side and end to end;
   h. orienting said third slat so that the strips are aligned diagonally;
   i. placing a second adhesive material on one of said first and second slats;
   j. placing said third slat on said second adhesive material oriented so that the strips of said third slat are orthogonal to the strips of the adjacent slat;
   k. applying heat and pressure to said slats to fuse them together into a precursor board;
   l. cutting from said precursor board a structural panel of desired length and width such that the strips of each slat intersect the edges of the structural panel edges at a substantially forty five degree angle:
   m. joining a plurality of said structural panels side by side and end to end to create a precursor sheet of predetermined length and width; and
   n. cutting from said precursor sheet a rectangular structural sheet of desired length and width such that the panels of each precursor sheet intersect the edges of the structural sheet at a substantially forty five degree angle;
whereby a structural sheet can be created of a length and width greater than the width and length of the component structural panels.

2. A method of creating a structural sheet unit comprising the steps of:
   a. joining a plurality of plywood structural panels side to side and end to end and aligned at a substantially forty five degree angle to parallel edges of the structural sheet unit; and
   b. cutting from said joined plurality of panels a structural sheet of predetermined length and width a structural sheet of desired length and width with the component panel edges intersecting said structural sheet edges at a substantially forty five degree angle.

\* \* \* \* \*